United States Patent
Desmarais et al.

(10) Patent No.: US 9,775,095 B2
(45) Date of Patent: Sep. 26, 2017

(54) AIRCRAFT PROXIMITY SENSOR SYSTEM FOR RADIO FREQUENCY TRANSMISSION DEVICE

(71) Applicant: CARRIER CORPORATION, Farmington, CT (US)

(72) Inventors: Richard Desmarais, Londonderry, NH (US); Stephen Varga, Bedford, NH (US)

(73) Assignee: Carrier Corporation, Jupiter, FL (US)

( * ) Notice: Subject to any disclaimer, the term of this patent is extended or adjusted under 35 U.S.C. 154(b) by 0 days.

(21) Appl. No.: 15/185,145

(22) Filed: Jun. 17, 2016

(65) Prior Publication Data

US 2016/0374001 A1    Dec. 22, 2016

Related U.S. Application Data

(60) Provisional application No. 62/181,324, filed on Jun. 18, 2015.

(51) Int. Cl.
| | |
|---|---|
| *H04W 24/00* | (2009.01) |
| *H04W 48/04* | (2009.01) |
| *H04W 48/16* | (2009.01) |
| *B64D 45/00* | (2006.01) |

(52) U.S. Cl.
CPC ............ *H04W 48/04* (2013.01); *B64D 45/00* (2013.01); *H04W 48/16* (2013.01); *B64D 2045/006* (2013.01)

(58) Field of Classification Search
USPC ...................................................... 455/456.4
See application file for complete search history.

(56) References Cited

U.S. PATENT DOCUMENTS

| | | | |
|---|---|---|---|
| 3,564,493 | A | 2/1971 | Hicklin |
| 5,485,634 | A | 1/1996 | Weiser et al. |
| 5,615,132 | A | 3/1997 | Horton et al. |
| 5,815,407 | A | 9/1998 | Huffman et al. |
| 6,011,973 | A | 1/2000 | Valentine et al. |
| 6,085,096 | A | 7/2000 | Nakamura |
| 6,246,891 | B1 | 6/2001 | Isberg et al. |
| 6,265,975 | B1 | 7/2001 | Zimmerman |
| 6,343,213 | B1 | 1/2002 | Steer et al. |
| 6,421,622 | B1 | 7/2002 | Horton et al. |
| 6,438,385 | B1 | 8/2002 | Heinonen et al. |
| 6,448,906 | B1 | 9/2002 | Nachtsheim et al. |
| 6,490,455 | B1 | 12/2002 | Park et al. |
| 6,496,703 | B1 | 12/2002 | da Silva |
| 6,643,517 | B1 | 11/2003 | Steer |
| 6,687,497 | B1 | 2/2004 | Parvulescu et al. |

(Continued)

FOREIGN PATENT DOCUMENTS

| | | |
|---|---|---|
| EP | 0641137 | 3/1995 |
| GB | 2329794 | 3/1999 |

(Continued)

OTHER PUBLICATIONS

US 6,768,414, 07/2004, Heinrich et al. (withdrawn)

*Primary Examiner* — Joel Ajayi
(74) *Attorney, Agent, or Firm* — Bachman & LaPointe, P.C.

(57) ABSTRACT

An aircraft proximity sensor system includes a control module in communication with a transceiver module and an aircraft proximity sensor module, the control module operable to disable transmission by the transceiver module in response to the aircraft proximity sensor module.

19 Claims, 4 Drawing Sheets

(56) References Cited

U.S. PATENT DOCUMENTS

| | | |
|---|---|---|
| 6,721,572 B1 | 4/2004 | Smith et al. |
| 6,782,266 B2 | 8/2004 | Baer et al. |
| 6,799,052 B2 | 9/2004 | Agness et al. |
| 6,832,093 B1 | 12/2004 | Ranta |
| 6,885,288 B2 | 4/2005 | Pincus |
| 6,917,291 B2 | 7/2005 | Allen |
| 6,922,059 B2 | 7/2005 | Zank et al. |
| 6,990,338 B2 | 1/2006 | Miller et al. |
| 6,993,329 B2 | 1/2006 | Cho et al. |
| 7,003,330 B2 | 2/2006 | Moles |
| 7,142,877 B2 | 11/2006 | Lipovski |
| 7,176,808 B1 | 2/2007 | Broad et al. |
| 7,181,229 B2 | 2/2007 | Singh et al. |
| 7,194,278 B1 | 3/2007 | Cook |
| 7,233,247 B1 | 6/2007 | Crossno et al. |
| 7,248,054 B2 | 7/2007 | Kalokitis et al. |
| 7,355,505 B2 | 4/2008 | Bonner et al. |
| 7,460,863 B2 | 12/2008 | Steelberg et al. |
| 7,460,866 B2 | 12/2008 | Salkini et al. |
| 7,475,806 B1 | 1/2009 | Crossno et al. |
| 7,493,565 B2 | 2/2009 | Parupudi et al. |
| 7,538,681 B1 | 5/2009 | Sharma et al. |
| 7,554,299 B2 | 6/2009 | Broad |
| 7,574,220 B2 | 8/2009 | Purkayastha et al. |
| 7,647,070 B2 | 1/2010 | Shah |
| 7,652,576 B1 | 1/2010 | Crossno et al. |
| 7,742,745 B2 | 6/2010 | Twitchell, Jr. |
| 7,791,455 B1 | 9/2010 | MacLean, III et al. |
| 7,796,038 B2 | 9/2010 | Batra |
| 7,798,400 B2 | 9/2010 | Skaaksrud et al. |
| 7,933,235 B2 | 4/2011 | Lott et al. |
| 7,986,269 B1 | 7/2011 | Kling et al. |
| 8,000,692 B2 | 8/2011 | Abel et al. |
| 8,061,607 B1 | 11/2011 | Crossno et al. |
| 8,078,124 B2 | 12/2011 | Kling et al. |
| 8,126,445 B2 | 2/2012 | Kennedy |
| 8,169,299 B2 | 5/2012 | Sharma |
| 8,214,370 B1 | 7/2012 | Turon et al. |
| 8,239,169 B2 | 8/2012 | Gregory et al. |
| 8,295,858 B2 | 10/2012 | Fox et al. |
| 8,299,920 B2 | 10/2012 | Hamm et al. |
| 8,301,082 B2 | 10/2012 | Twitchell, Jr. |
| 8,315,617 B2 | 11/2012 | Tadayon et al. |
| 8,353,006 B2 | 1/2013 | Lynch et al. |
| 8,374,623 B2 | 2/2013 | Vellanki et al. |
| 8,473,238 B2 | 6/2013 | Miller et al. |
| 8,502,672 B1 | 8/2013 | Crossno |
| 8,521,428 B1 | 8/2013 | Liccardo et al. |
| 8,576,064 B1 | 11/2013 | Mitchell |
| 8,626,193 B1 | 1/2014 | Crossno et al. |
| 8,655,378 B1 | 2/2014 | Crossno et al. |
| 8,731,538 B2 | 5/2014 | Cook et al. |
| 8,824,360 B2 | 9/2014 | Muller et al. |
| 8,825,436 B2 | 9/2014 | Zhang et al. |
| 8,832,792 B2 | 9/2014 | Mikan |
| 2002/0017989 A1 | 2/2002 | Forster et al. |
| 2002/0039896 A1 | 4/2002 | Brown |
| 2002/0145536 A1 | 10/2002 | Clise |
| 2003/0132853 A1 | 7/2003 | Ebert |
| 2004/0098060 A1 | 5/2004 | Ternes |
| 2004/0192188 A1 | 9/2004 | Dieudonne |
| 2005/0170850 A1 | 8/2005 | Edwards et al. |
| 2006/0152357 A1 | 7/2006 | Hyde |
| 2006/0160562 A1 | 7/2006 | Davis et al. |
| 2006/0176175 A1 | 8/2006 | Evans et al. |
| 2006/0258376 A1 | 11/2006 | Ewell, Jr. |
| 2007/0285238 A1 | 12/2007 | Batra |
| 2008/0004040 A1 | 1/2008 | Bogart |
| 2008/0015801 A1 | 1/2008 | Sharma |
| 2008/0045200 A1 | 2/2008 | Skinner et al. |
| 2009/0117919 A1 | 5/2009 | Hershenson |
| 2009/0315704 A1 | 12/2009 | Rosing et al. |
| 2009/0325566 A1 | 12/2009 | Bell et al. |
| 2010/0231164 A1 | 9/2010 | Yang |
| 2010/0255858 A1 | 10/2010 | Juhasz |
| 2010/0267375 A1 | 10/2010 | Lemmon et al. |
| 2010/0279626 A1 | 11/2010 | Bradley et al. |
| 2011/0078089 A1 | 3/2011 | Hamm et al. |
| 2011/0256884 A1 | 10/2011 | Kazmi et al. |
| 2011/0283235 A1 | 11/2011 | Kling et al. |
| 2011/0314490 A1 | 12/2011 | Keen et al. |
| 2012/0161958 A1 | 6/2012 | Turon et al. |
| 2012/0212323 A1 | 8/2012 | Skaaksrud et al. |
| 2012/0214506 A1 | 8/2012 | Skaaksrud et al. |
| 2012/0216252 A1 | 8/2012 | Skaaksrud et al. |
| 2012/0232847 A1 | 9/2012 | Horton et al. |
| 2013/0214909 A1 | 8/2013 | Meijers et al. |
| 2013/0295904 A1 | 11/2013 | Putman |
| 2013/0346336 A1 | 12/2013 | Murphy et al. |
| 2014/0125452 A1 | 5/2014 | Josefiak |
| 2014/0330737 A1 | 11/2014 | Williams et al. |

FOREIGN PATENT DOCUMENTS

| | | |
|---|---|---|
| WO | 9857518 | 12/1998 |
| WO | 9918745 | 4/1999 |
| WO | 0060556 | 10/2000 |
| WO | 0131960 | 5/2001 |
| WO | 2004064003 | 7/2004 |
| WO | 2010003151 | 1/2010 |
| WO | 2012009738 | 1/2012 |
| WO | 2012171943 | 12/2012 |
| WO | 2013044399 | 4/2013 |
| WO | 2013131072 | 9/2013 |

AIRCRAFT PROXIMITY SENSOR SYSTEM FOR RADIO FREQUENCY TRANSMISSION DEVICE

CROSS REFERENCE TO RELATED APPLICATION

This application claims the benefit of provisional application Ser. No. 62/181,324, filed Jun. 18, 2015.

BACKGROUND

The present disclosure relates generally to sensor systems, and more particularly, to a system and a method of transmission control.

Portable electronic devices are prolific and increasingly used outside the proximity of humans. One application includes Active RFID and similar technologies (such as cell phone based triangulation or Wi-Fi/Wi-MAX) often track shipments throughout the freight transportation system or supply chain. Wireless communication circuitry may include RFID (Radio Frequency Identification) tags when the entity using the tags wants to track the geographical position of the tags through the additional use of GPS (global positioning system) or other location determining circuitry.

If such tags are attached to items being shipped by air, the wireless communication circuitry portion of these tags must be deactivated or otherwise modified while in the presence of operational aircraft. If such deactivation requires human intervention, there is a likelihood that such deactivation (or reactivation) may be overlooked. Thus it would be desirable to have circuitry that can detect a situation such as the presence of operational aircraft and automatically deactivate at least the wireless communication circuitry signal transmission capability while the tag remains in the immediate vicinity of operational aircraft.

Automated deactivation/activation may utilize proprietary technology that incorporates sensor input from a number of sources that are used in algorithms to predict when the device is on an aircraft. The sensors may detect the aircraft radio transponder, an accelerometer, a barometric pressure sensor, or an ultrasonic frequency sensor to detect the noise from the jet engine, and possibly others. These sensed parameters are then used to disable a radio frequency (RF) transmitter to comply with airline requirements. These methods may be relatively effective but are centered on measuring pressure altitude or motion that necessarily relies on aircraft movement.

SUMMARY

An aircraft proximity sensor system according to one disclosed non-limiting embodiment of the present disclosure can includes a control module in communication with a transceiver module and an aircraft proximity sensor module, the control module operable to disable transmission by the transceiver module in response to the aircraft proximity sensor module.

A further embodiment of the present disclosure may include, wherein the aircraft proximity sensor system is incorporated within a radio frequency transmission device.

A further embodiment of any of the embodiments of the present disclosure may include, wherein the radio frequency transmission device includes a data logger.

A further embodiment of any of the embodiments of the present disclosure may include, wherein the transceiver module is operable to transmit a cellular signal.

A further embodiment of any of the embodiments of the present disclosure may include, wherein the aircraft proximity sensor module includes an aircraft/tower radio communication sensor.

A further embodiment of any of the embodiments of the present disclosure may include, wherein the aircraft/tower radio communication sensor is operable to detect transmission between 118.000-136.975 MHz.

A further embodiment of any of the embodiments of the present disclosure may include, wherein the aircraft/tower radio communication sensor is operable to detect transmission at 120.000 MHz.

A further embodiment of any of the embodiments of the present disclosure may include, wherein the aircraft/tower radio communication sensor is operable to detect transmission on an Air Traffic Control Frequency.

A further embodiment of any of the embodiments of the present disclosure may include, wherein the aircraft/tower radio communication sensor is operable to detect transmission on a Company Airlines Operational Control Frequency.

A further embodiment of any of the embodiments of the present disclosure may include, wherein the aircraft/tower radio communication sensor is operable to detect transmission on at least one of a Unicom, multicom, Flight Services, and Traffic Advisory (CTAF) frequency for an uncontrolled airport.

A further embodiment of any of the embodiments of the present disclosure may include, wherein the control module is operable to disable transmission by the transceiver module in response to the aircraft proximity sensor module being proximate a stationary aircraft.

A further embodiment of any of the embodiments of the present disclosure may include, wherein the aircraft proximity sensor module includes a tri-axis electromagnet field sensor.

A further embodiment of any of the embodiments of the present disclosure may include, wherein the tri-axis electromagnet field sensor is operable to detect electromagnetic fields generated by an aircraft.

A further embodiment of any of the embodiments of the present disclosure may include, wherein the tri-axis electromagnet field sensor is operable to detect electromagnetic fields at 400 Hz.

A further embodiment of any of the embodiments of the present disclosure may include, wherein the control module is operable to disable transmission by the transceiver module in response to the aircraft proximity sensor module being proximate an aircraft with inactive jet engines.

A further embodiment of any of the embodiments of the present disclosure may include, wherein the aircraft proximity sensor module includes an aircraft/tower radio communication sensor and a tri-axis electromagnet field sensor.

A method of transmission control for a data logger, the method according to another disclosed non-limiting embodiment of the present disclosure can include detecting a proximity to an aircraft; and disabling transmission from a data logger in response to the proximity.

A further embodiment of any of the embodiments of the present disclosure may include, wherein detecting the proximity includes detecting the proximity to a stationary aircraft.

A further embodiment of any of the embodiments of the present disclosure may include, wherein detecting the proximity includes detecting the proximity while the jet engines of the aircraft are inactive.

A further embodiment of any of the embodiments of the present disclosure may include, wherein detecting the proximity includes detecting aircraft/tower radio communication.

A further embodiment of any of the embodiments of the present disclosure may include, wherein detecting the proximity includes detecting radio transmission between 118.000-136.975 MHz.

A further embodiment of any of the embodiments of the present disclosure may include, wherein detecting the proximity includes detecting aircraft power system operation.

A further embodiment of any of the embodiments of the present disclosure may include, wherein detecting the proximity includes detecting electromagnetic fields generated by an aircraft.

A further embodiment of any of the embodiments of the present disclosure may include, wherein detecting the proximity includes detecting electromagnetic fields at 400 Hz.

A further embodiment of any of the embodiments of the present disclosure may include, wherein detecting the proximity includes detecting aircraft power system operation and detecting aircraft/tower radio communication.

A further embodiment of any of the embodiments of the present disclosure may include, wherein detecting the proximity includes detecting aircraft power system operation and detecting aircraft/tower radio communication.

A further embodiment of any of the embodiments of the present disclosure may include, cycling the detection thereof in a periodic manner to confirm the absence of aircraft/tower radio communication.

A further embodiment of any of the embodiments of the present disclosure may include, cycling the detection continuously to confirm the absence of aircraft/tower radio communication.

A further embodiment of any of the embodiments of the present disclosure may include, enabling transmission from the data logger in response to the proximity subsequent to the disabling.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

Various features will become apparent to those skilled in the art from the following detailed description of the disclosed non-limiting embodiment. The drawings that accompany the detailed description can be briefly described as follows.

DETAILED DESCRIPTION

Figure 1:
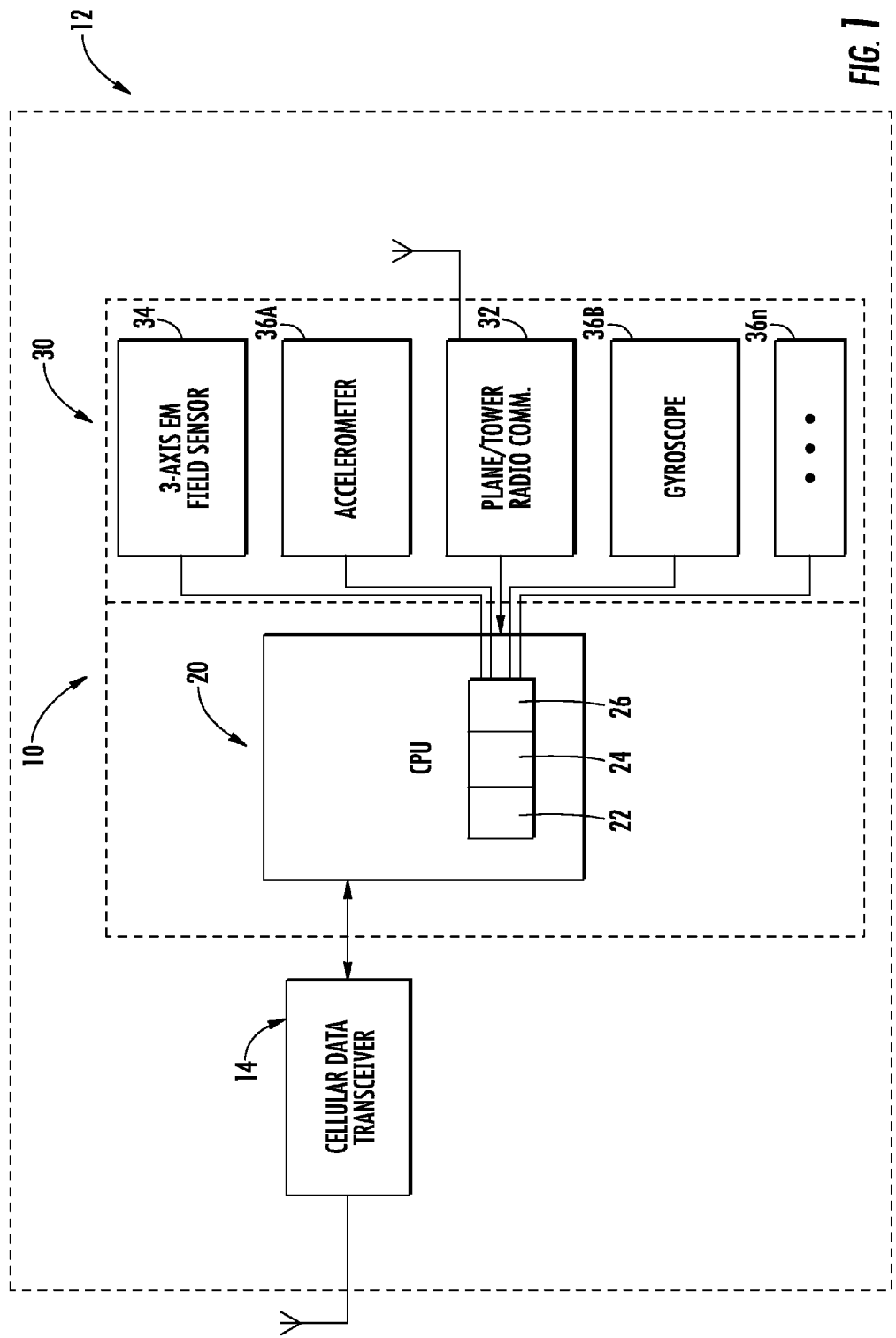
FIG. 1 is a general schematic system diagram of a sensor system.

FIG. 1 schematically illustrates an aircraft proximity sensor system 10. The system 10 may be incorporated within a radio frequency transmission device 12 such as a data logger, a cell phone, an RFID tag or other device that includes a transceiver module 14 that is operable to transmit a radio frequency (RF) signal, such as a cellular signal, which may require a change of state in response to an operational condition of an aircraft where the transmission of the RF signals are regulatory prohibited as having the potential to interfere with electronics onboard the aircraft. In one example, the device 12 may be a temperature, humidity, $CO_2$ or other data logger that may be associated with cargo or other airborne equipment transported or contained within the aircraft such as a gas turbine engine data logger.

In one embodiment, the aircraft proximity sensor system 10 includes a control module 20 with a processor 22, a memory 24, and an interface 26. The processor 22 can include any type of microprocessor having desired performance characteristic. The memory 24 can include any type of computer readable medium that stores the data and control processes disclosed herein. That is, the memory 24 is an example computer storage media that can have embodied thereon computer-useable instructions such as a process that, when executed, can perform a desired method. The interface 26 of the control module 20 can facilitate communication between the control module 20 and other systems and or modules such as the transceiver module 14 and an aircraft proximity sensor module 30.

Figure 2:
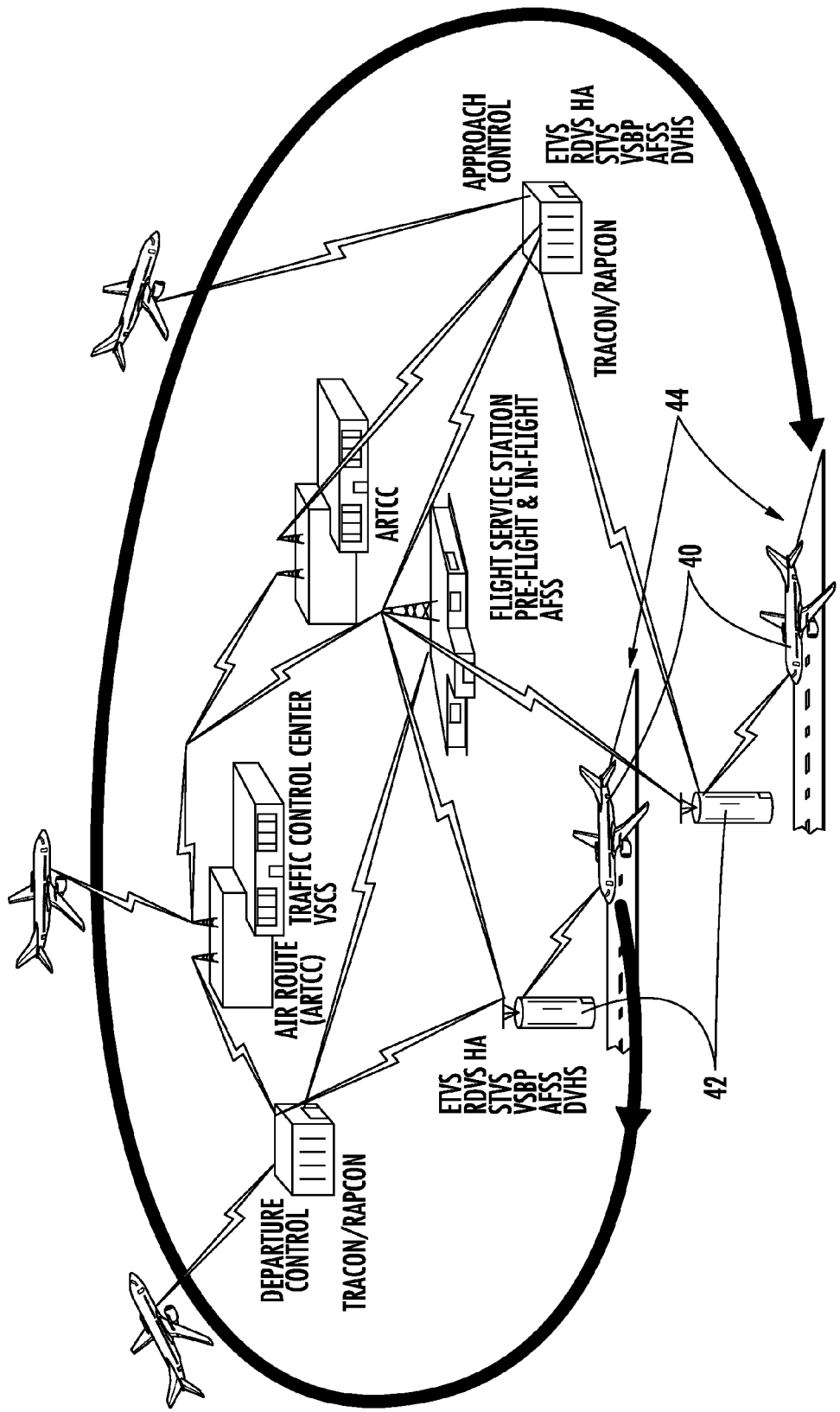
FIG. 2 is a schematic view of aircraft communications along a flight.

In one example aircraft proximity sensor module 30, an aircraft/tower radio communication sensor 32 is operable to detect radio communications between an aircraft 40 and a control tower 42 when the aircraft is within the immediate vicinity of an airport 44 or other environment where such communication is typically utilized (FIG. 2). The aircraft/tower radio communication sensor 32 may be operable in an allotted aircraft/tower radio communication band, e.g., general commercial frequencies such as:

118.000-121.950 Air Traffic Control
121.975-123.650 Unicom, multicom, Flight Services, Traffic Advisory (CTAF) at uncontrolled airports
123.675-128.800 Air Traffic Control
128.825-132.000 Company Airlines Operational Control
132.025-136.475 Air Traffic Control
136.500-136.975 Company Airlines Operational Control It should be appreciated that a tower controller is typically responsible for aircraft in the immediate area around the airport (typically up to 3000 feet and 5 miles from the airport). Once the aircraft leaves the airspace of the airport, the aircraft is handed off to a controller at a Terminal Radar Approach Control (TRACON) or an Air Route Traffic Control Centers (ARTCC Center), commonly referred to as Air Traffic Control which operates on different frequencies (FIG. 2).

In this embodiment, the aircraft/tower radio communication sensor 32 need be but a relatively uncomplex radio operable at, for example, 120 MHz. Since this sensing scheme is passive, there is no local oscillator such that no interference can be generated. Further, since this sensing scheme requires a relatively strong signal and operates only over a very limited distance, application thereof is advantageous in this application. The aircraft/tower radio communication sensor 32 is thereby readily operable to passively detect when the aircraft is proximate the airport 44. It should be appreciated that terms such as proximity, are indicative of a relative position to an aircraft or a geographical location whereby RF transmissions from the radio frequency transmission device 12 may be prohibited such as airport 44 (FIG. 2).

Figure 3:
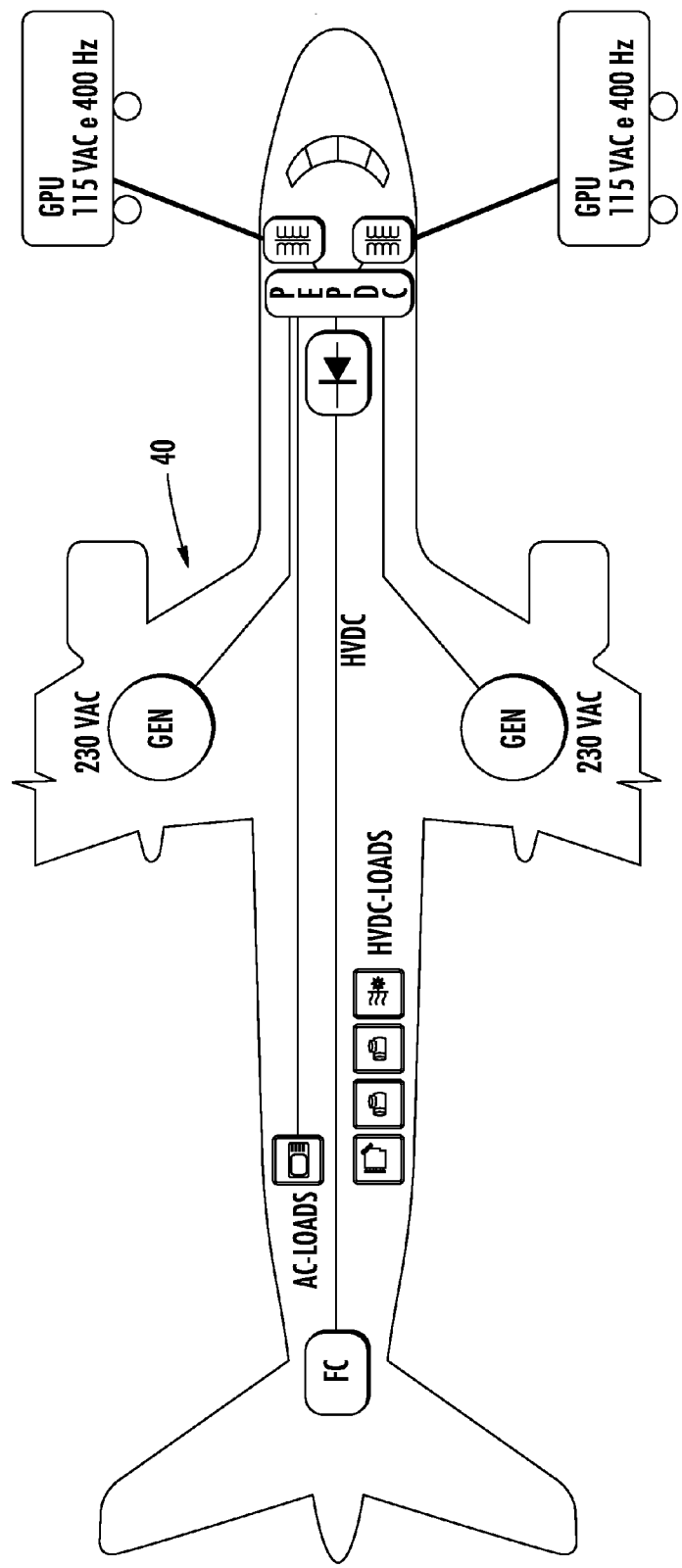
FIG. 3 is a schematic view of an aircraft.

In another example aircraft proximity sensor module 30, a tri-axis electromagnet field sensor 34 is operable to detect electromagnetic fields generated by an aircraft. For example, aircraft typically utilize power supplies of 115 volts (V) AC at 400 Hertz (Hz) to generate, regulate and distribute electrical power throughout the aircraft 40 due to the benefits of relatively smaller and lighter transformers (FIG. 3). These are distinct from the 60 Hz and 50 Hz frequency alternating current electromagnetic fields generated in terrestrial power distribution systems. The tri-axis electromagnet field sensor 34 is thereby readily operable to passively detect when the aircraft is operating.

It should be appreciated that the tri-axis electromagnet field sensor 34 may be utilized independently or in combination with the aircraft/tower radio communication sensor 32 to determine whether the transceiver module 14 requires a change of state in response to a situation such as whether the aircraft is operating in an environment where the transmission of such RF signals could potentially interfere with electronics onboard the aircraft such as takeoff or landing.

Still other sensors 36A, 36B, 36n such as an accelerometer, gyroscope, GPS, etc., or combinations thereof, with an integrated control algorithm, may be utilized in combination with the aircraft proximity sensor module 30, to further delineate whether the transceiver module 14 requires a change of state. For example, the aircraft proximity sensor system 10 is passively operable to detect that the aircraft is proximate an environment in which the radio frequency transmission device 12 is to be disabled before any motion is initiated, such as before the airplane pushes back from a gate and/or before the engines are started.

Figure 4:
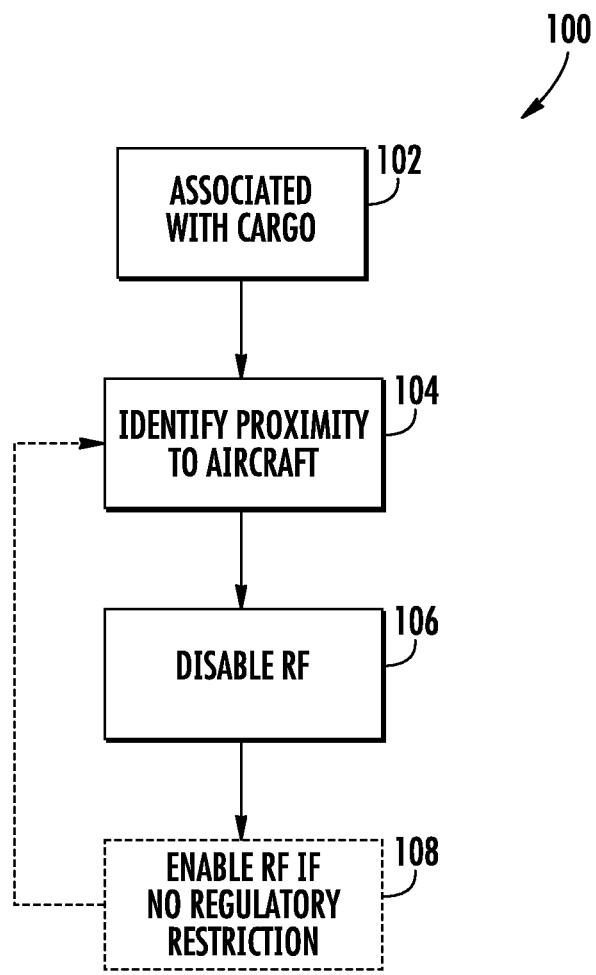
FIG. 4 is a flowchart illustrating a method for operation of the sensor system according to one disclosed non-limiting embodiment.

With reference to FIG. 4, in one embodiment, a method 100 for operation of the aircraft proximity sensor system 10 is disclosed in terms of functional block diagrams. It should be appreciated that these functions may be enacted in either dedicated hardware circuitry or programmed software routines capable of execution in various microprocessor based electronics control embodiments such as that of control module 20.

Initially, the aircraft proximity sensor system 10 may be associated with cargo or other airborne equipment transported or contained within the aircraft (step 102).

Next, should the aircraft proximity sensor module 30 identify that the aircraft proximity sensor system 10 is proximate an aircraft (step 104), the control module 20 responds by disabling transmissions from the radio frequency transmission device 12 (step 106). In one embodiment, the aircraft proximity sensor system 10 includes the aircraft/tower radio communication sensor 32 to detect communications either from the aircraft associated with the aircraft proximity sensor system 10 or other communications proximate thereto such as that associated with other aircraft at the airport that indicates the aircraft proximity sensor system 10 is proximate aircraft.

In this example, the control module 20 may again enable transmissions from the radio frequency transmission device 12 once the aircraft proximity sensor system 10 is no longer regulatory restricted, e.g., greater than 3000 feet and 5 miles from the airport (step 108) as, for example, communications detectable by the aircraft/tower radio communication sensor 32 are no longer utilized. That is, aircraft/tower radio communication is not utilized in flight.

In another example, the aircraft proximity sensor system 10 includes the tri-axis electromagnet field sensor 34 to identify that the aircraft proximity sensor system 10 is proximate an operational aircraft (step 104). That is, the tri-axis electromagnet field sensor 34 may be utilized alone or in combination with the aircraft/tower radio communication sensor 32. In this example, the tri-axis electromagnet field sensor 34 is operable to identify that the aircraft proximity sensor system 10 is proximate an operational aircraft irrespective of the aircraft operational conditions. That is, if the aircraft power supplies are operating, the tri-axis electromagnet field sensor 34 may be utilized to disable transmissions from the radio frequency transmission device 12.

In still another example, the tri-axis electromagnet field sensor 34 may be utilized in combination with the aircraft/tower radio communication sensor 32 to identify that the aircraft proximity sensor system 10 is aboard an aircraft, but that aircraft is outside a range detectable by the aircraft/tower radio communication sensor 32 (step 108). That is, the aircraft is in flight but not proximate an airport, e.g., not landing, taking off, taxiing, etc. The control module 20 may thereby accordingly enable or disable the radio frequency transmission device 12 as programmed.

The method 100 for operation of the aircraft proximity sensor system 10 may cycle, e.g., continuously or periodically, to identify that the aircraft proximity sensor system 10 is aboard an aircraft, but that aircraft is outside a range detectable by the aircraft/tower radio communication sensor 32 (step 108) such that, for example, the control module 20 may more specifically enable or disable the radio frequency transmission device 12 as programmed. In other words, the more specific proximity determination increases the utilization of the radio frequency transmission device 12 and thus the data therefrom.

Alternatively, or in addition, one or more other sensors 36A, 36B, 36n (FIG. 1) may utilized in combination with the aircraft/tower radio communication sensor 32 and/or the tri-axis electromagnet field sensor 34 to further facilitate the identification of the aircraft operational conditions, e.g., takeoff, landing, cruise, taxi, etc.

These sensing schemes can thereby advantageously detect their presence near or on an aircraft even before any motion starts, allowing the cellular or other transmitter to be disabled even prior to movement and/or engine operation of the aircraft.

The elements described and depicted herein, including in flow charts and block diagrams throughout the figures, imply logical boundaries between the elements. However, according to software or hardware engineering practices, the depicted elements and the functions thereof may be implemented on machines through computer executable media having a processor capable of executing program instructions stored thereon as a monolithic software structure, as standalone software modules, or as modules that employ external routines, code, services, and so forth, or any combination of these, and all such implementations may be within the scope of the present disclosure.

The use of the terms "a," "an," "the," and similar references in the context of description (especially in the context of the following claims) are to be construed to cover both the singular and the plural, unless otherwise indicated herein or specifically contradicted by context. The modifier "about" used in connection with a quantity is inclusive of the stated value and has the meaning dictated by the context (e.g., it includes the degree of error associated with measurement of the particular quantity). All ranges disclosed herein are inclusive of the endpoints, and the endpoints are independently combinable with each other.

Although the different non-limiting embodiments have specific illustrated components, the embodiments of this invention are not limited to those particular combinations. It is possible to use some of the components or features from any of the non-limiting embodiments in combination with features or components from any of the other non-limiting embodiments.

It should be appreciated that like reference numerals identify corresponding or similar elements throughout the several drawings. It should also be appreciated that although a particular component arrangement is disclosed in the illustrated embodiment, other arrangements will benefit herefrom.

Although particular step sequences are shown, described, and claimed, it should be understood that steps may be performed in any order, separated or combined unless otherwise indicated and will still benefit from the present disclosure.

The foregoing description is exemplary rather than defined by the limitations within. Various non-limiting embodiments are disclosed herein, however, one of ordinary skill in the art would recognize that various modifications and variations in light of the above teachings will fall within the scope of the appended claims. It is therefore to be understood that within the scope of the appended claims, the disclosure may be practiced other than as specifically described. For that reason the appended claims should be studied to determine true scope and content.

What is claimed:

1. An aircraft proximity sensor system, comprising:
   a transceiver module;
   an aircraft proximity sensor module, said aircraft proximity sensor module includes a tri-axis electromagnet field sensor operable to detect electromagnetic fields generated by an aircraft, and an aircraft/tower radio communication sensor operable to detect transmission on at least one of a Unicom, multicom, Flight Services, and Traffic Advisory (CTAF) frequency for an uncontrolled airport; and
   a control module in communication with said transceiver module and said aircraft proximity sensor module, said control module operable to disable transmission by said transceiver module in response to said aircraft proximity sensor module, wherein said control module is operable to disable transmission by said transceiver module in response to said aircraft proximity sensor module being proximate an aircraft with inactive jet engines.

2. The system as recited in claim 1, wherein said aircraft proximity sensor system is incorporated within a radio frequency transmission device.

3. The system as recited in claim 2, wherein said radio frequency transmission device includes a data logger.

4. The system as recited in claim 1, wherein said transceiver module is operable to transmit a cellular signal.

5. The system as recited in claim 1, wherein said aircraft/tower radio communication sensor is operable to detect transmission between 118.000-136.975 MHz.

6. The system as recited in claim 1, wherein said aircraft/tower radio communication sensor is operable to detect transmission at 120.000 MHz.

7. The system as recited in claim 1, wherein said aircraft/tower radio communication sensor is operable to detect transmission on an Air Traffic Control Frequency.

8. The system as recited in claim 1, wherein said aircraft/tower radio communication sensor is operable to detect transmission on a Company Airlines Operational Control Frequency.

9. The system as recited in claim 1, wherein said control module is operable to disable transmission by said transceiver module in response to said aircraft proximity sensor module being proximate a stationary aircraft.

10. The system as recited in claim 9, wherein said tri-axis electromagnet field sensor is operable to detect electromagnetic fields at 400 Hz.

11. A method of transmission control for a data logger, the method comprising:
    detecting a proximity to an aircraft via an aircraft proximity sensor module that includes a tri-axis electromagnet field sensor operable to detect electromagnetic fields generated by the aircraft, and an aircraft/tower radio communication sensor operable to detect transmission on at least one of a Unicom, multicom, Flight Services, and Traffic Advisory (CTAF) frequency for an uncontrolled airport; and
    disabling transmission from a data logger in response to the proximity with the aircraft while the aircraft has inactive jet engines.

12. The method as recited in claim 11, wherein detecting the proximity includes detecting the proximity to a stationary aircraft.

13. The method as recited in claim 11, wherein detecting the proximity includes detecting radio transmission between 118.000- 136.975 MHz.

14. The method as recited in claim 11, wherein detecting the proximity includes detecting aircraft power system operation.

15. The method as recited in claim 14, wherein detecting the proximity includes detecting electromagnetic fields generated by the aircraft.

16. The method as recited in claim 14, wherein detecting the proximity includes detecting electromagnetic fields at 400 Hz.

17. The method as recited in claim 11, further comprising cycling the detection thereof in a periodic manner to confirm the absence of aircraft/tower radio communication.

18. The method as recited in claim 11, further comprising cycling the detection continuously to confirm the absence of aircraft/tower radio communication.

19. The method as recited in claim 11, further comprising enabling transmission from the data logger in response to the proximity subsequent to the disabling.

* * * * *